(12) United States Patent
Murozaki et al.

(10) Patent No.: US 6,970,572 B2
(45) Date of Patent: Nov. 29, 2005

(54) HEADPHONE DEVICE

(75) Inventors: Katsunori Murozaki, Chiba (JP); Koji Nageno, Tokyo (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 09/941,143

(22) Filed: Aug. 28, 2001

(65) Prior Publication Data

US 2002/0031238 A1    Mar. 14, 2002

(30) Foreign Application Priority Data

Aug. 31, 2000   (JP)  ............................ P2000-263495

(51) Int. Cl.[7] ............................................ H04R 25/00
(52) U.S. Cl. ...................... 381/381; 381/374; 381/379
(58) Field of Search .............................. 381/361, 367, 381/381, 385, 74, 330, 327–329, 370, 371, 381/373, 374, 376–380

(56) References Cited

U.S. PATENT DOCUMENTS

| | | | | |
|---|---|---|---|---|
| 5,293,647 A | * | 3/1994 | Mirmilshteyn et al. | 2/209 |
| 5,457,751 A | * | 10/1995 | Such | 381/375 |
| 6,154,539 A | * | 11/2000 | Pitel | 379/430 |
| 6,434,250 B1 | * | 8/2002 | Tsuhako | 381/374 |

FOREIGN PATENT DOCUMENTS

CN   12555819   6/2000

* cited by examiner

*Primary Examiner*—Curtis Kuntz
*Assistant Examiner*—Alexander Jamal
(74) *Attorney, Agent, or Firm*—Jay H. Maioli

(57) ABSTRACT

A headphone device having a headband assembly worn on the head and a headphone main body attached to one end of the headband assembly. The headphone device is provided with an ear device that prevents slipping when worn and stabilizes wearability. The headphone main body is attached to the headband assembly in a rotatable manner so that the axis of rotation may be inclined with the center line of the headphone main body. The headphone main body can be matched to the inclination of the ear and the headphone device has stabilized wearability, improved sound quality, and improved comfort when worn.

6 Claims, 10 Drawing Sheets

F I G. 12
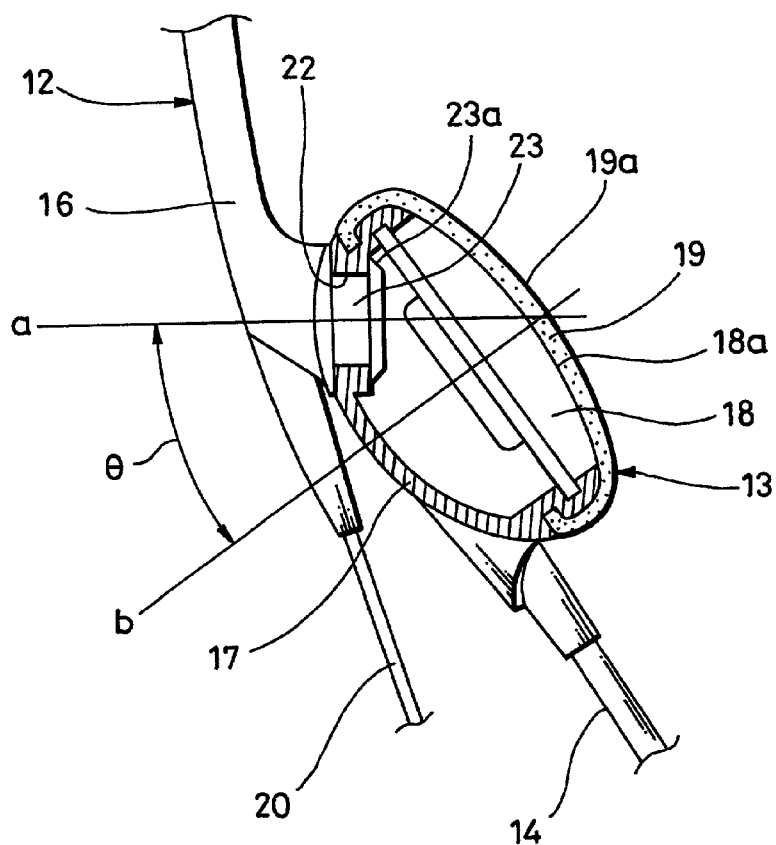
F I G. 13
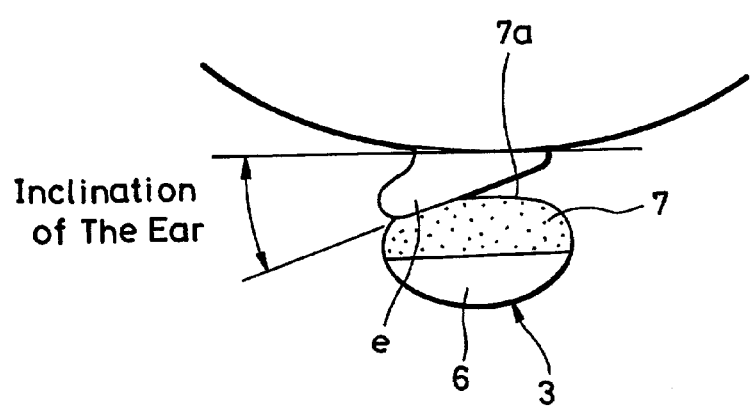

HEADPHONE DEVICE

BACKGROUND OF THE INVENTION

1. Field of the Invention

The present invention relates to a headphone device and in particular, to a headphone device with stabilized wearability.

2. Description of the Related Art

To start with, the construction of the conventional headphone device shown in FIG. 7 will be described.

This headphone device 1 is comprised of a headband assembly 2 worn on the head and a headphone main body 3 that is attached to at least one end of the headband assembly 2.

The headband assembly 2 is comprised of an arch-shaped headband 4 and a hanger 5 linked to one end of the headband 4. A headphone main body 3 is attached to the inside at the lower end of the hanger 5.

The hanger 5 can be adjusted by a sliding expansion/contraction adjustment with respect to the headband 4. In other words, the position of the headphone main body 3 can be freely adjusted by adjusting the expansion/contraction of the hanger 5 with respect to the headband 4.

The headphone main body 3 includes an internal speaker unit contained in a housing 6 that is fixed to the hanger 5 and a sponge-like ear pad 7 is attached in such a manner that it covers the sound emitting surface of the speaker unit.

In the FIG. 8 denotes a cord and the speaker unit internally contained in the housing 6 of the headphone main body 3 is electrically connected to an acoustic device through this cord 8.

As shown in FIG. 8, the headphone device 1 constructed in this manner is used with the headband assembly 2 being worn on the head and the ear pad of the headphone main body 3 being pressed on the ear e. This construction the headphone device allows the headphone main body 3 to be pressed on either left ear or right ear.

A conventional headphone device as described above however, can easily slip when worn. In particular, there have been many occurrences in which the headphone device slips down feel from the head of the user due to vibrations when worn for a long period of time while the user is moving.

Moreover, as shown in FIG. 13, the ear e is inclined with the side of the head as seen from above the head. However, a conventional headphone device has the housing 6 of the headphone main body 3 fixed to the headband assembly 2. Consequently, the wearing surface 7a of the ear pad 7 does not correspond to the inclination of the ear e.

For this reason, a conventional headphone device had disadvantages of a strange feeling when worn and sound escaping from the gap that exists between the headphone main body 3 and the ear e thereby reducing the sound quality.

The object of the present invention is to provide a headphone device that can solves these types of problems and can improve the feeling when worn and sound quality by means of matching the headphone main body to the inclination of the ear.

SUMMARY OF THE INVENTION

In order to achieve the above-mentioned objects, the present invention provides a headphone device comprised of a headband assembly worn on the head, and a headphone main body that is attached to at least one end of the headband assembly and has an internal speaker unit, wherein the headphone device is provided with an ear device that hangs on the ear to prevent slipping when worn.

By providing this ear device the headphone device of the present invention can have stabilized wearability without its slipping when worn.

BRIEF DESCRIPTION OF THE DRAWINGS

FIG. 12 is a cross sectional view showing the construction of the principal parts (portion where the headphone main body is attached to the headband assembly) of the headphone device of the embodiment; and FIG. 13 is an explanatory view showing the conventional headphone device being pressed on the ear.

DESCRIPTION OF THE PREFERRED EMBODIMENTS

In the following an embodiment of the present invention will be described with reference to the drawings.

Figure 1:
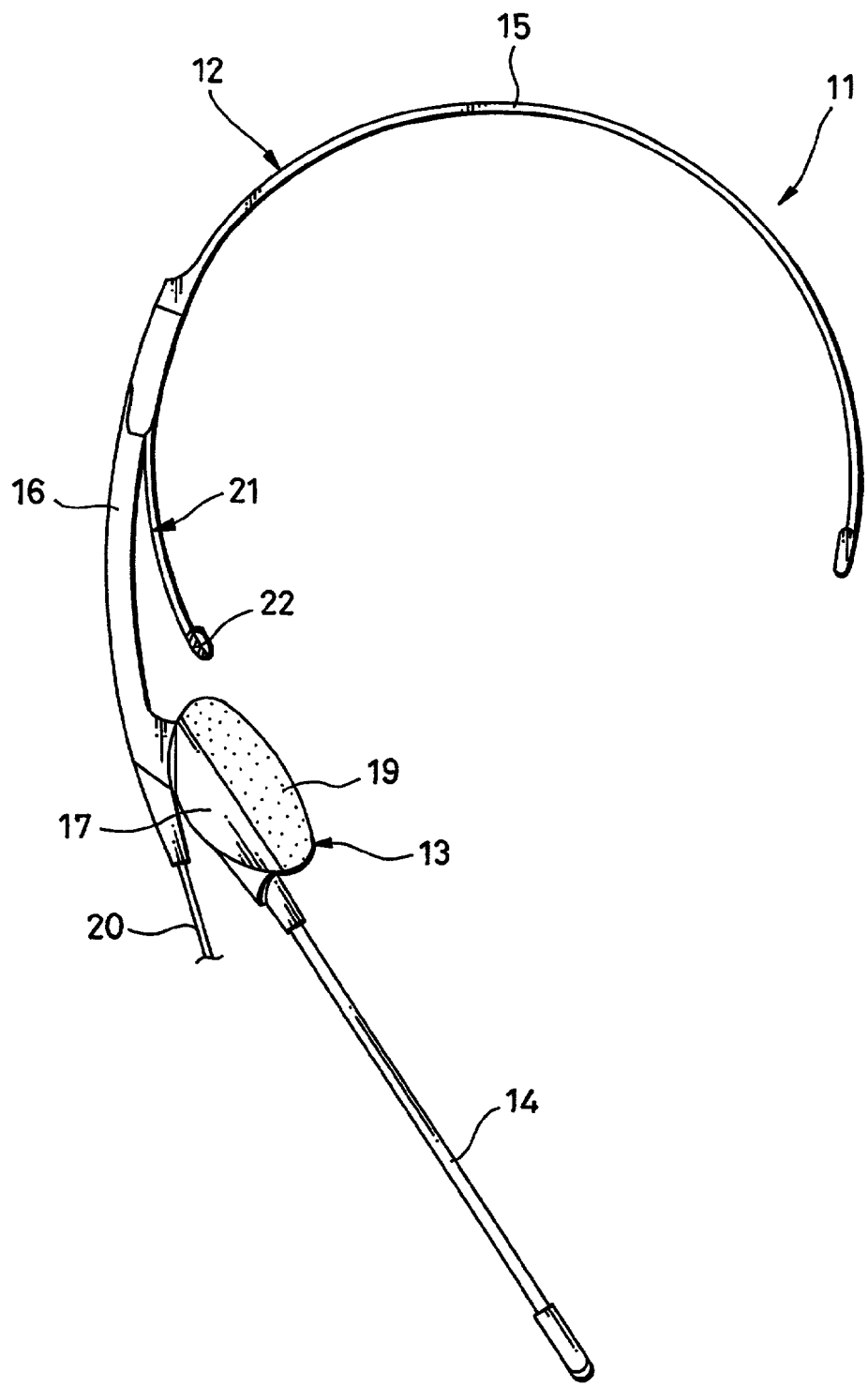
FIG. 1 is a front view showing an embodiment of the headphone device according to the present invention.

FIG. 1 is a front view of the headphone device 11 according to the present invention.

Figure 9:
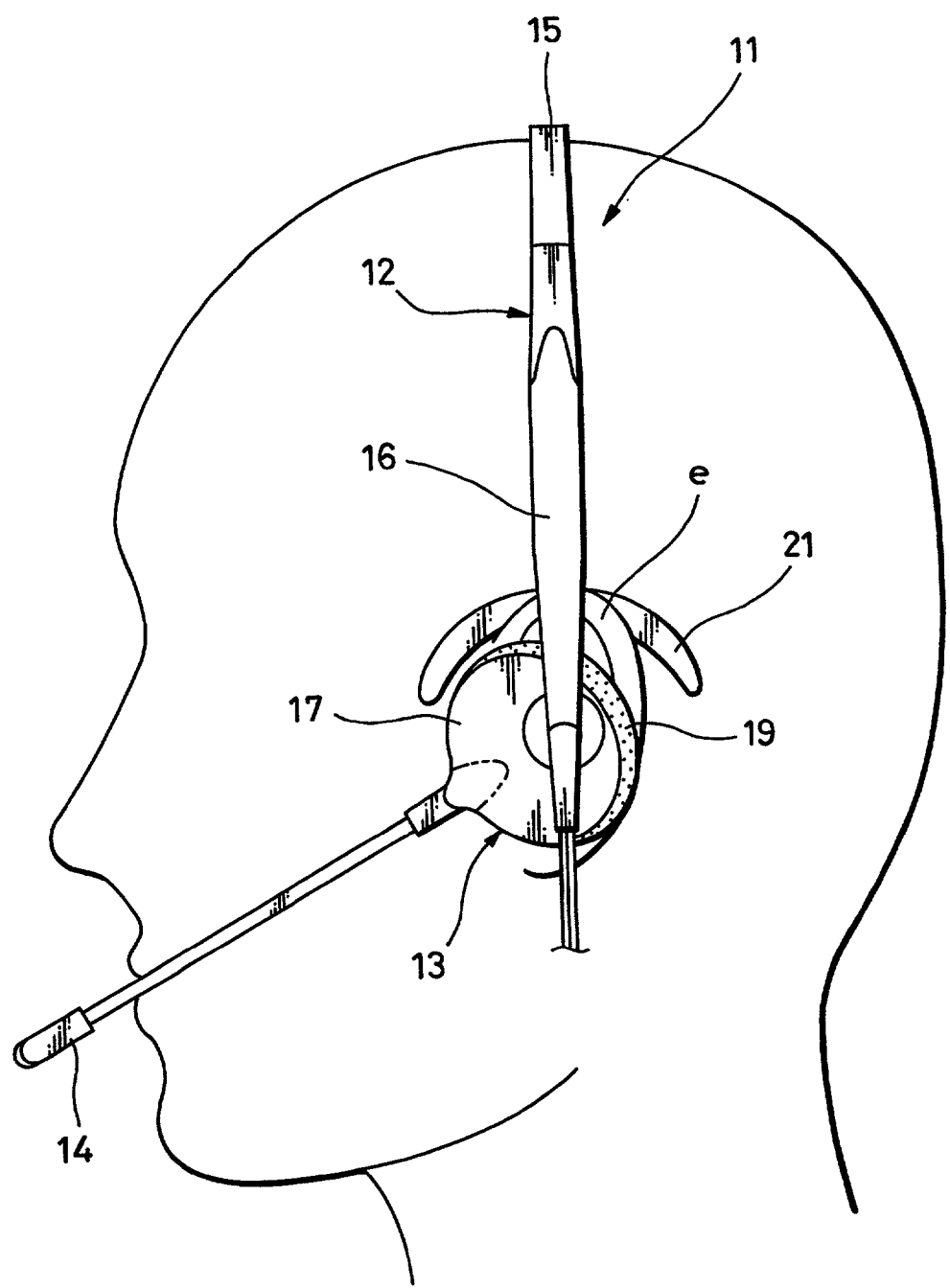
FIG. 9 is a side view showing the headphone device of the embodiment being worn (headphone main body is pressed on the contact with the left ear)

This headphone device 11 is a so-called headset and includes by a headband assembly 12 that is worn on the head, a headphone main body 13 that is attached to at least one end of the headband assembly 12, and a microphone device 14 disposed in such a manner that it extends from the headphone main body 13, as shown in FIG. 9.

The headband assembly 12 is comprised of an arch-shaped headband 15 that are both molded and a hanger 16 linked to one end of the headband 15. The headphone main body 13 is attached to the inside at the lower end of the hanger 16.

The hanger 16 can be adjusted by a sliding expansion/contraction adjustment with respect to the headband 15. In other words, the position of the headphone main body 13 can be freely adjusted by means of adjusting the expansion/contraction of the hanger 16 with respect to the headband 15 in a rotatable manner.

As shown in FIG. 12, the headphone main body 13 contains internally a speaker unit 18 in a housing 17 molded of a plastic material. A sponge-like ear pad 19 is attached in such a manner that it covers the sound emitting surface 18a of the speaker unit 18.

In the figure, 20 denotes a cord. The speaker unit 18 internally contained in the housing 17 of the headphone main body 13 and a microphone unit internally contained in the microphone device 14 are electrically connected to an acoustic device through this cord 20.

In addition, as shown in FIG. 1 an ear device 21 is integrally provided on the inside of the hanger 16 of the headband assembly 12 in this headphone device 11.

Figure 2:
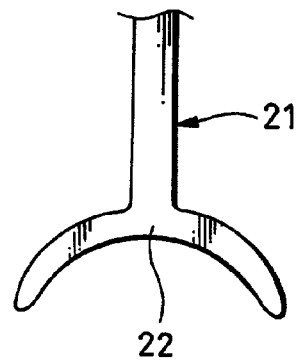
FIG. 2 is a side view showing the shape of the ear device in the headphone device of the embodiment.

The ear device 21 is formed of a piece of plastic material integrated with the hanger 16 and comprises an arm 22 that extends from the upper portion of the hanger 16 downward. As shown in FIG. 2 seen from the side, an arch shape is formed on the end of the arm 22.

Figure 4:
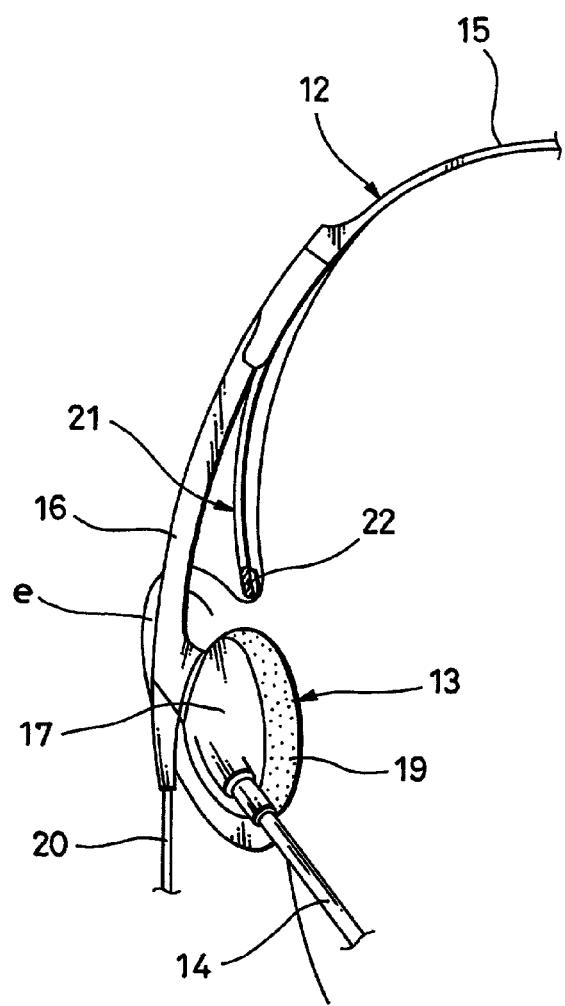
FIG. 4 is a front view of the principal parts of the headphone device in of the embodiment.
Figure 3:
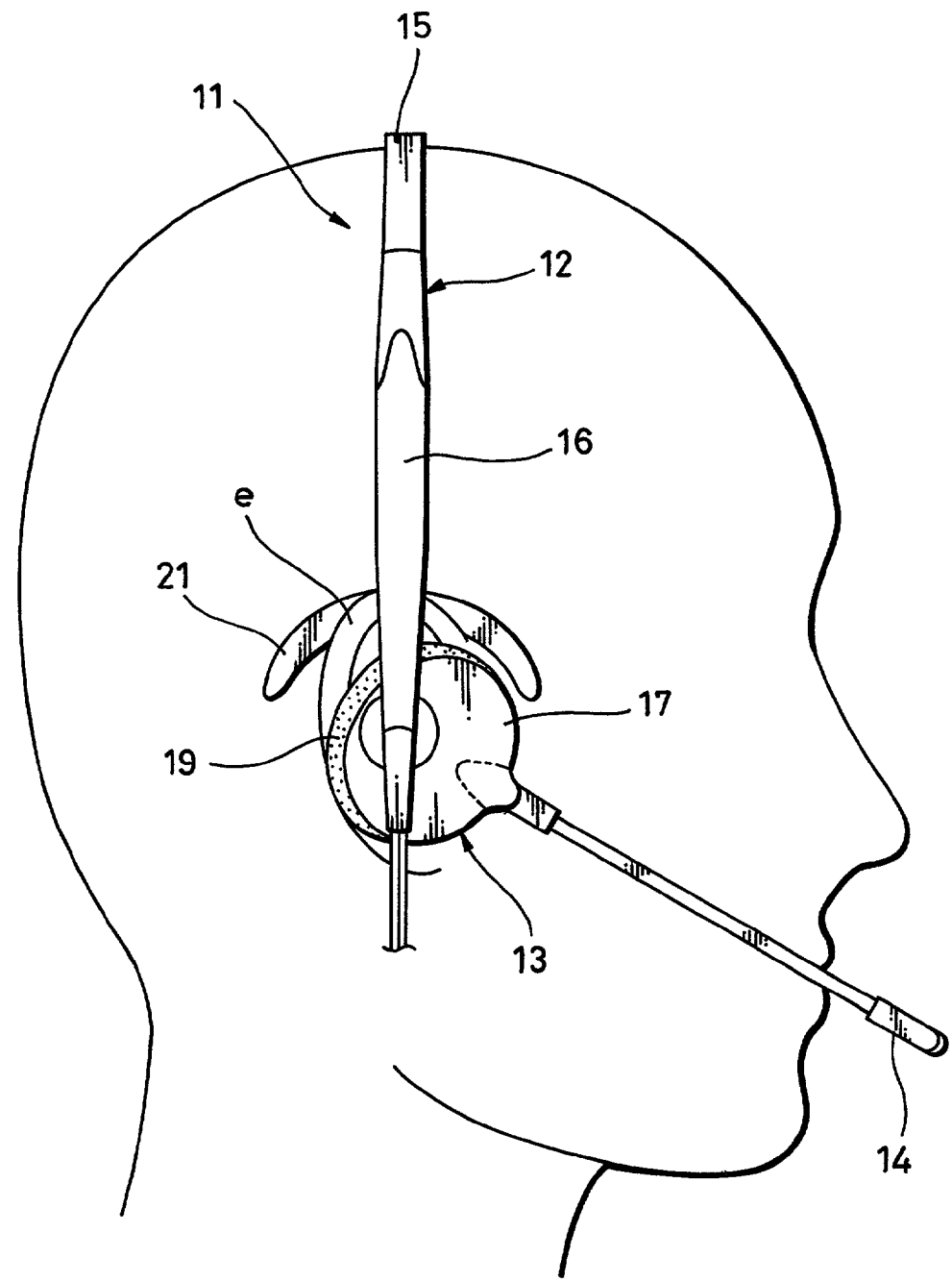
FIG. 3 is a side view showing the headphone device of the embodiment being worn (headphone main body is pressed on the right ear)

As shown in FIG. 3, the headphone device 11 comprised as described above is worn by placing the headband assembly 12 on the head with the ear pad 19 of the headphone main body 13 pressed on the ear e. At this time, as shown in FIG. 3 and FIG. 4, the headphone device 11 is securely worn without any slipping off the ear e due to the fact that the ear device 21 is hung on the ear e.

Further, because the ear device 21 acts to securely maintain the wearing state of the headphone device 11 even if the user moves about while wearing the headphone device 11, stabilized wearability can be obtained without the headphone device slipping down from the head.

Various shapes for the ear device 21 other than the shape shown in FIG. 2 can be considered.

Figures 5A, 5B:
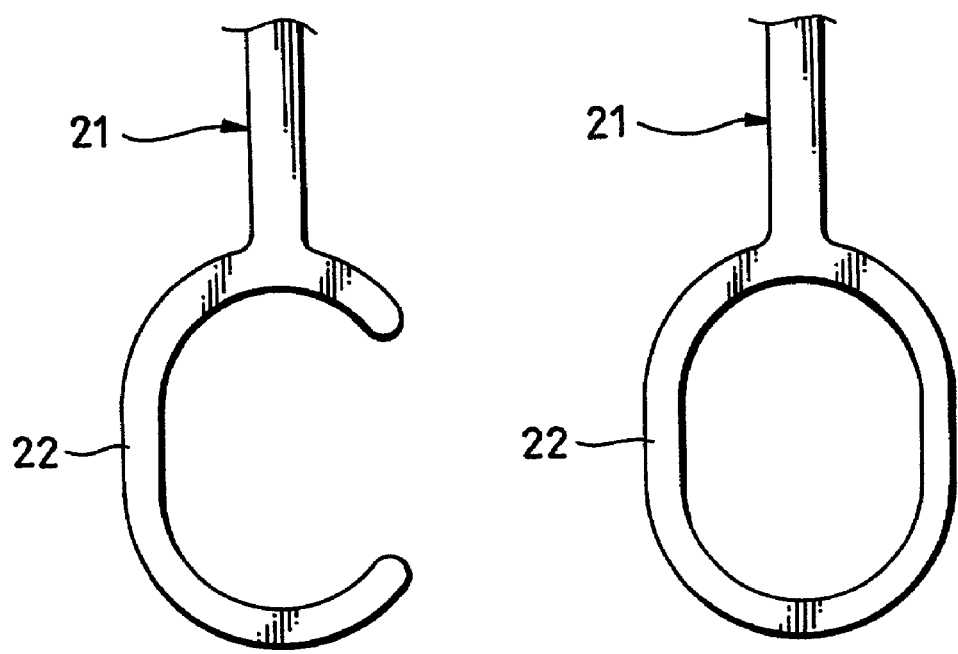
FIG. 5 is an explanatory view showing examples of different constructions of the ear device.
Figure 5C:
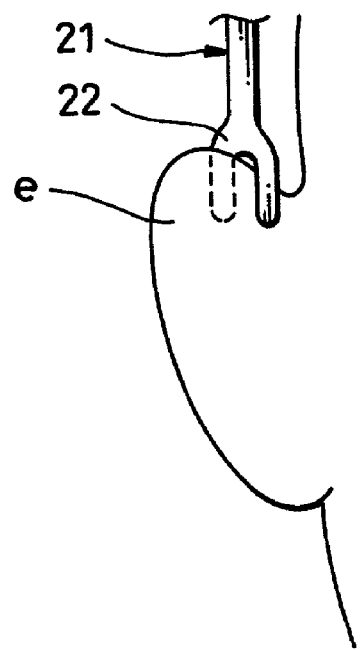

FIG. 5A to FIG. 5C show another shape examples of the ear device 21.

FIG. 5A shows an example of the end of the arm 22 (portion hung on the ear) of the ear device 21 with a C-shape. FIG. 5B shows the end of the arm 22 with a ring shape.

In addition, as shown in FIG. 5C, the ear device 21 can also have a shape in which the ends of the arm 22 pinch the ear.

Figures 6A, 6B:
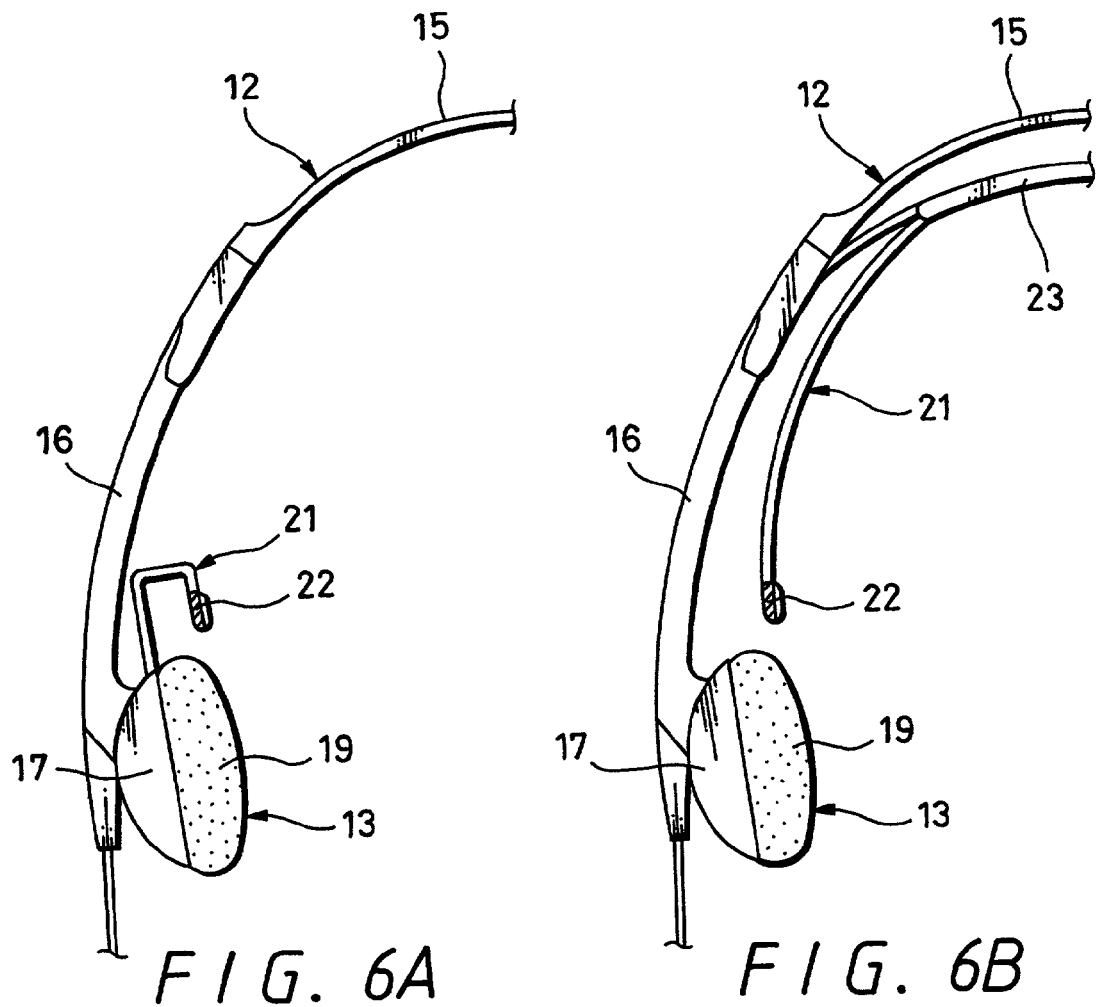
FIG. 6 is an explanatory view showing examples of different shapes of the ear device.
Figure 6C:
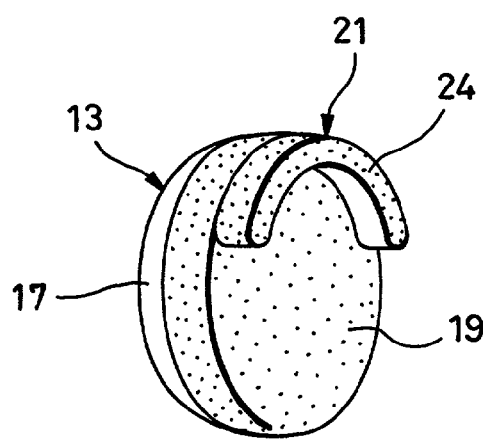
Figure 7:
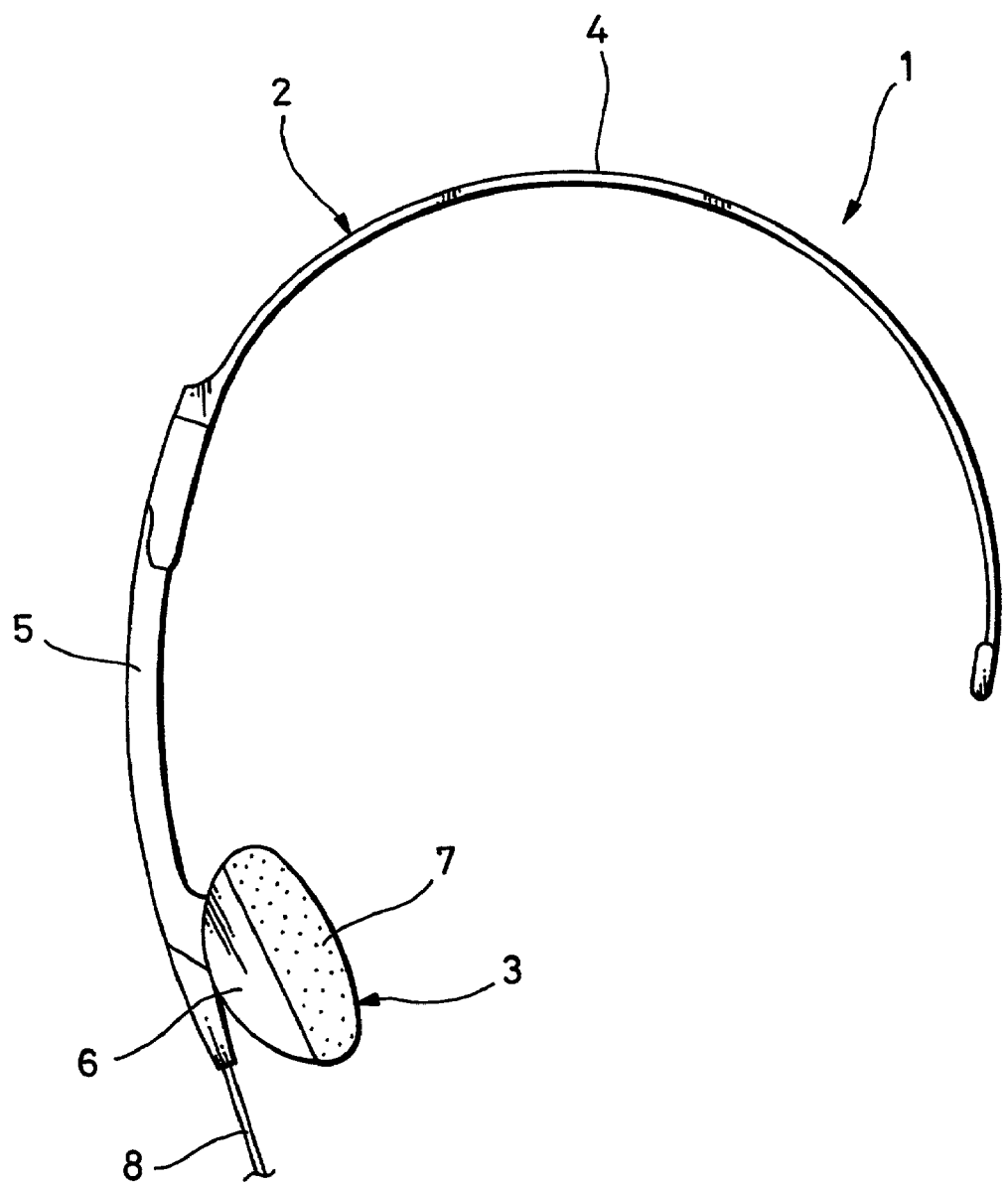
FIG. 7 is a front view showing a conventional headphone device.
Figure 8:
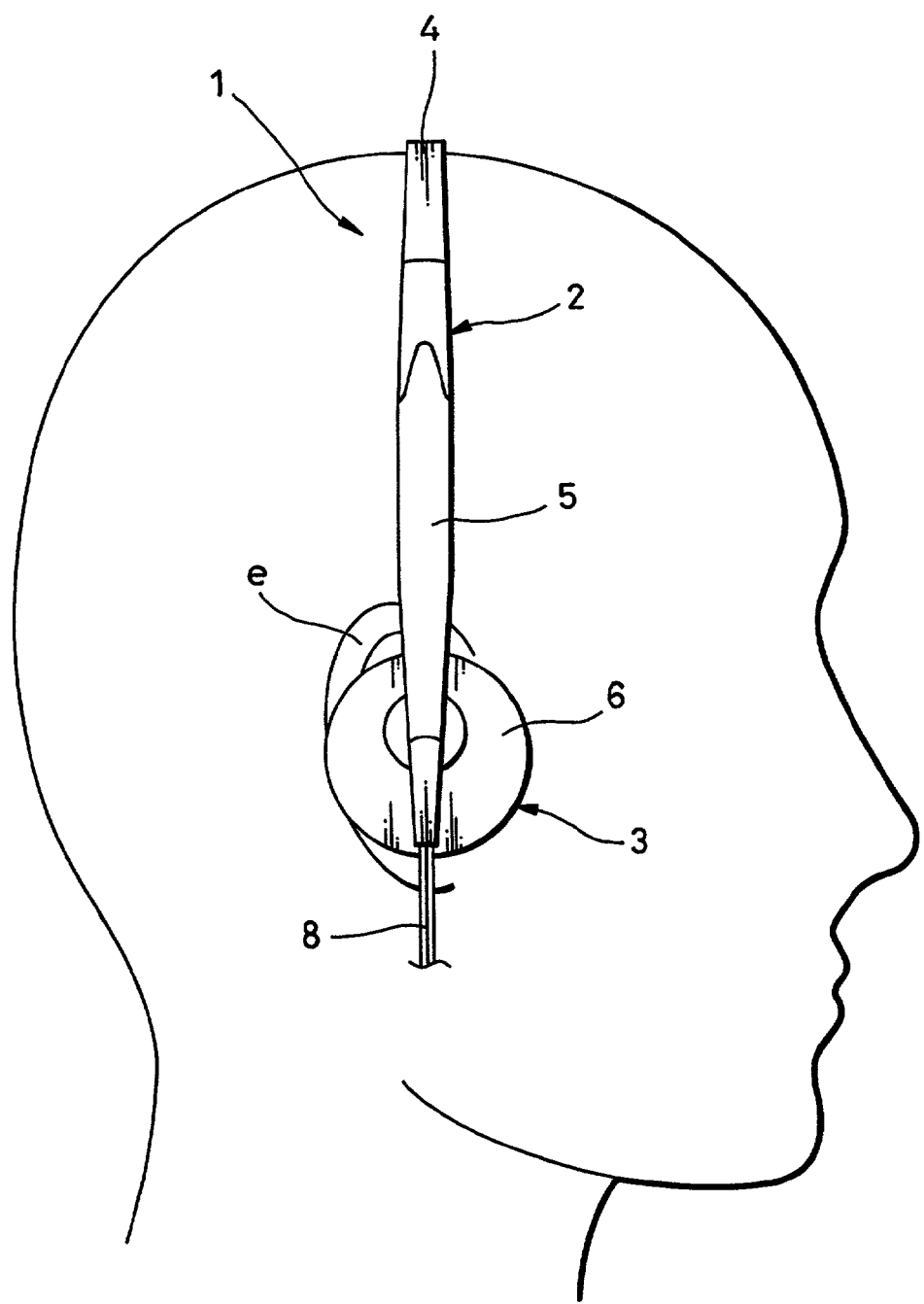
FIG. 8 is a side view showing a conventional headphone device being worn.

FIG. 6A to FIG. 6C show other structure examples of the ear device 21.

Namely, FIG. 6A shows an example that the ear device 21 is provided in such a manner that it extends outward from the housing 17 of the headphone main body 13.

FIG. 6B shows an example that, when a headphone device is provided with a suspender 23 on the inside of the headphone assembly 12, the ear device 21 extends from the suspender 23.

As shown in FIG. 6C of a headphone device may be provided with an arch-shaped protruding portion 24 that functions as the ear device 21 on the surface where the ear pad 19 of the headphone main body 13 is pressed. In this case, the protruding portion 24 that functions as the ear device 21 can either be formed integrated with the ear pad 19 as one unit or formed as a separate device attached to the ear pad 19.

Although embodiments of the present invention have been described above, this invention is not limited to those examples.

Figure 10:
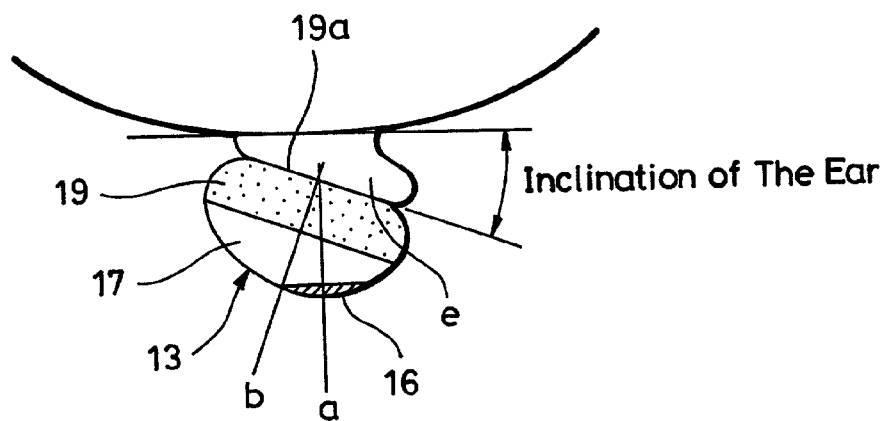
FIG. 10 is an explanatory view showing the headphone main body of the headphone device of the embodiment being pressed on the left ear.
Figure 11:
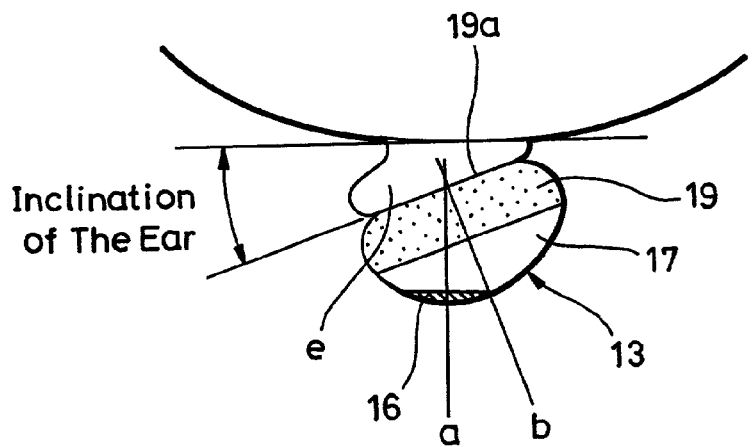
FIG. 11 is an explanatory view showing the headphone main body of the headphone device of the embodiment being pressed on the right ear.

For instance, although there have been disclosed examples in which the present invention is applied to a headphone device that has the headphone main body 13 only on one end of the headband assembly 12, the present invention can also be applied to a headphone device that has the headphone main body 13 on both ends of the headband assembly 12. In this case, the beneficial effect of the present invention is especially enhanced, as shown in FIGS. 10 and 11, if the ear device 21 is provided on both ends of the headband assembly 12.

Furthermore, the structure and shape of the ear device 21 is not limited to the examples described above and in short it can be a device that hangs on the ear when wearing a headphone device.

Moreover, the ear device 21 can also freely be attached or detached.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A headphone device comprising a resilient headband assembly worn over a top of a user's head and a headphone main body that has an internal speaker unit and that is attached to an end of said headband assembly, by a hanger wherein said headphone device is provided with an ear device formed of plastic and attached to an inside of said hanger, wherein said ear device contacts an ear of the user at an upper location where the ear is attached to the user's head and solely supports the headphone main body and prevents slipping of said headphone device, whereby the headphone main body is positioned against an ear of the user, so that an angle of inclination of the headphone device is substantially equal to an angle of inclination of the ear of the user when the headphone main body is positioned against the ear of the user.

2. A headphone device comprising:

an arch-shaped headband for resting on a top of a user's head;

a hanger attached to one end of said headband and adapted for expansion and contraction movement relative to said one end of said headband;

a housing containing a speaker and being attached to an end of said hanger opposite to an end attached to said one, end of said headband;

an earpad attached to said housing and having an external surface for placement against an ear of the user; and an ear device attached to said hanger for movement therewith and being in the form of a strip with an arm at an end of the strip opposite to an end attached to said hanger, wherein upon expansion or contraction of said hanger said arm rests on an upper surface of the ear of the user at a location where the ear is joined to the head and said ear device solely supports said housing, whereby an angle of inclination of the earpad is substantially equal to an angle of inclination of the ear of the user when the earpad is positioned against the ear of the user.

3. The headphone device according to claim 2, further comprising a microphone device attached to said housing for detecting voice sounds of the user.

4. The headphone device according to claim 2, wherein said arm is arch-shaped so as to extend partially around the location of the ear where the ear joins the head.

5. The headphone device according to claim 2, further comprising:

a cord for connecting said speaker to a source of audio signals.

6. The headphone device according to claim 2, further comprising:

a microphone device attached to said housing for detecting voice sounds of the user; and a cord for connecting said speaker to a source of audio signals and for carrying output signals from said microphone.

* * * * *